Dec. 24, 1935.   A. I. LOOP ET AL   2,025,600
ADJUSTABLE CAM
Filed Oct. 7, 1933
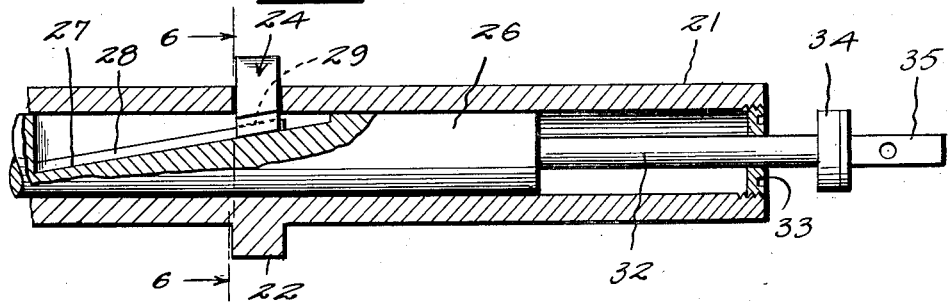
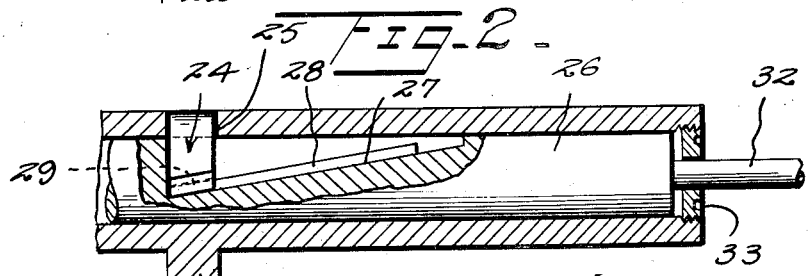
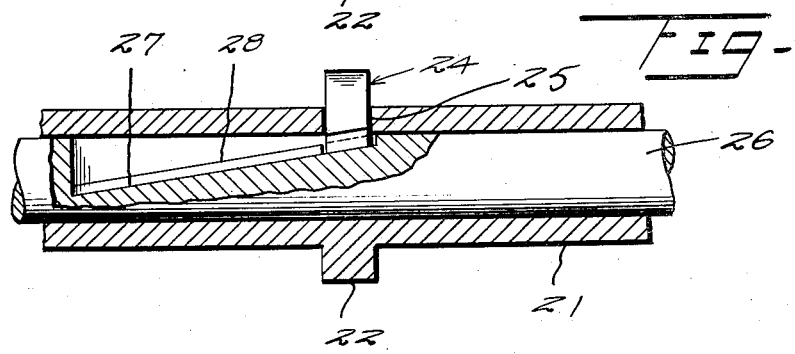
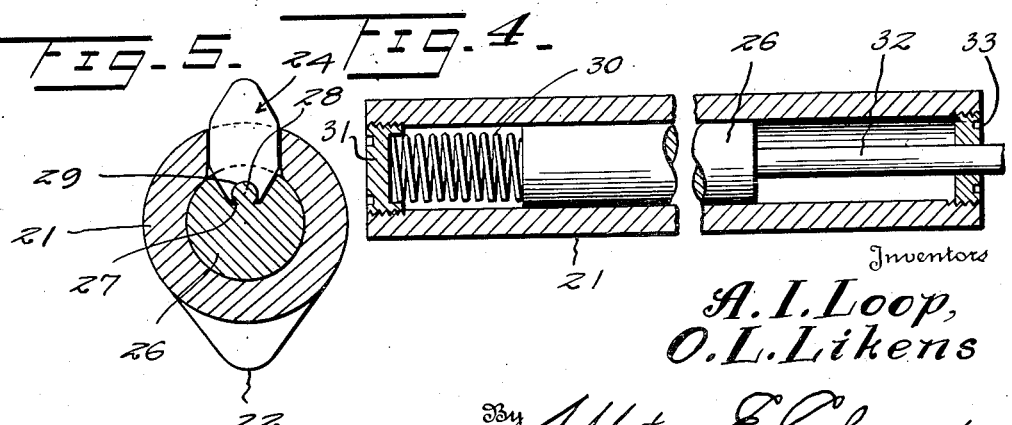
Inventors
*A. I. Loop,*
*O. L. Likens*
By *Watson E. Coleman*
Attorney Patented Dec. 24, 1935

2,025,600

UNITED STATES PATENT OFFICE 2,025,600

ADJUSTABLE CAM

Admah I. Loop and Orville L. Likens, North East, Pa., assignors of one-half to George W. Loop, Cleveland, Ohio Application October 7, 1933, Serial No. 692,706

2 Claims. (Cl. 74—568)

This invention relates to braking devices and more particularly to a braking means for a motor vehicle.

An object of this invention is to provide a braking device which can be incorporated in a motor vehicle construction in a manner whereby the conventional friction brake structure will not be required to retard or stop the movement of a vehicle particularly where the vehicle is going down a relatively long grade.

Another object of this invention is to provide an optional braking means whereby the vehicle may be stopped by either an air braking means or the conventional friction braking device.

A further object of this invention is to provide an air brake structure which may be incorporated in a conventional internal combustion engine in a manner whereby the internal combustion engine is converted into a compressor which operates to retard the movement of the vehicle without the use of the friction brake structure.

A still further object of this invention is to provide an improved cam structure for an internal combustion engine whereby the conventional four cycle engine which compresses on only one out of four strokes will compress air instead of gases on every other stroke of the pistons.

Still another object of this invention is to provide in a braking structure of this kind means whereby the compressed air may be released at will and in the desired amount so as to provide the desired braking pressure on the wheels of the vehicle independent of the friction brake structure.

The above and various other objects and advantages of this invention will in part be described and in part be understood from the following detailed description of the present preferred embodiment, the same being illustrated in the accompanying drawing wherein:—

Figure 1 is a fragmentary longitudinal section partly in detail of an improved cam structure whereby the conventional cam shaft of the motor vehicle may be converted into a cam shaft which will operate the intake and exhaust valves of the engine on each stroke of each piston.

Figure 2 is a view similar to Figure 1 but showing the cam structure in inoperative position.

Figure 3 is a view similar to Figure 2 but showing the manner of inserting each cam member in the hollow cam shaft.

Figure 4 is a fragmentary longitudinal section of the cam shaft showing the means for automatically holding the converting cam members in inoperative position.

Figure 5 is a sectional view taken on the line 6—6 of Figure 1.

Referring to the drawing, in order to convert a motor which is a conventional four cycle motor, into an air compressor which will compress air on every other stroke of the pistons or on every upstroke of the pistons, we have provided an improved cam structure comprising a hollow cam shaft 21 provided at spaced points therealong with fixed cam members 22 which are adapted to engage the lower ends of lift rods 23. These cam members 22 are adapted to be used when the motor is operated as an internal combustion engine.

Inasmuch as the cam shaft 21 is so connected with the crank shaft of the motor as to rotate at one-half the speed of the crank shaft, we have provided a plurality of movable cam members, generally designated as 24, which are slidable in slots or openings 25 provided in the hollow cam shaft 21 at points opposed to the fixed cam members 22. A cam operating member in the form of a sliding member 26 is slidable within the hollow cam shaft 21, and is provided at spaced points therealong with cut out portions 27 which cut out portions are inclined to the longitudinal axis of the slide member 26. A key member 28 is carried by the slide member 26 in the recess or cut out portion 27, and this key member is adapted to engage a keyway 29 formed in the inner end of the cam 24.

As shown in Figure 3, the key 27 terminates at a point inwardly of the shallow end of the recess 27 so that in the mounting of the cam members in the hollow shaft 21 for operation by the slide member 26, the slide member 26 is initially disposed in the shaft 21 with the shallow portion of the recess 27 confronting the opening 25. The cam member 24 is then passed through the opening 25 and the slide member 26 is then moved in the opposite direction which will cause the key member 28 to engage in the keyway 29 and to thereby draw the cam 24 inwardly or into inoperative position.

A spring 30 is disposed within the hollow shaft 21 and engages against one end of the slide 26 and acts to constantly urge this slide 26 in a manner to carry the cam members 24 inwardly or into inoperative position. A plug or tensioning member 31 is threaded into this end of the shaft 21 and engages against the outer end of the spring 30.

The opposite end of the slide 26 has a reduced bar 32 secured thereto which extends through a packing gland 33 carried by the opposite end of the cam shaft 21. A swivel head 34 is carried by the outer end of the bar or extension 32. A shaft 35 is swivelly connected with the swivel head 34.

In the use and operation of this cam structure, the shaft 26 is normally urged in the direction of the gland 23 by the spring 30 and when the end of the shaft 26 is adjacent the gland 23 the movable cam 24 will be disposed with the outer surface thereof substantially flush with the surface of the cam shaft 21, as shown in Figure 2. When it is desired to move the cam 24 into operative position, the operating member 35 is pushed inwardly so as to move the shaft 26 against the tension of the spring 30 and this movement of the shaft 26 will forcibly move the cam 24 outwardly, as shown in Figure 1. The operative position of the cam 24, is as shown in Figure 1 but if it is desired to remove the cam 24, the shaft 26 is movable inwardly an additional distance so that the blank space at the end of the recess 27 will release the key engaging portion of the cam 24 from the key 28.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A device as set forth comprising a hollow shaft, a fixed cam carried by the shaft, an inner shaft slidable in said hollow shaft, said inner shaft being provided with an inclined channel opening through one side thereof, a key substantially round in transverse section at the bottom of the channel and extending longitudinally thereof, said hollow shaft having an opening opposed to said fixed cam, and a movable cam slidably engaging in said opening, said movable cam having a keyway at its inner end in which said key engages whereby said movable cam member is forcibly moved in and out upon longitudinal movement of said inner shaft.

2. In a device as set forth, a hollow cam shaft, a fixed cam member carried by the shaft, an inner shaft within said hollow shaft and provided with a recess inclined to the length of the inner shaft, the walls of the recess converging in an inward direction, a key member extending lengthwise of the recess, said hollow shaft having an opening in the wall thereof diametrically opposed to said fixed cam member, and a movable cam member extending through said opening, said movable cam member having a tapered inner end portion slidably engaging the walls of the recess and provided at its inner end with a key engaging portion substantially embracing said key whereby said movable cam member is moved in and out of the opening upon longitudinal movement of said inner shaft within said hollow shaft.

ADMAH I. LOOP.
ORVILLE L. LIKENS.